(12) United States Patent
Finlayson

(10) Patent No.: US 6,452,497 B1
(45) Date of Patent: Sep. 17, 2002

(54) CARRIER IDENTIFICATION DEVICE

(76) Inventor: Frank John Finlayson, 242 Leitchs Road, Brendale Old (AU), 4500

( * ) Notice: Subject to any disclaimer, the term of this patent is extended or adjusted under 35 U.S.C. 154(b) by 0 days.

(21) Appl. No.: 09/786,380

(22) PCT Filed: Sep. 2, 1999

(86) PCT No.: PCT/AU99/00718
§ 371 (c)(1),
(2), (4) Date: Mar. 2, 2001

(87) PCT Pub. No.: WO00/13515
PCT Pub. Date: Mar. 16, 2000

(30) Foreign Application Priority Data

| Sep. 2, 1998 | (AU) | PP 5649 |
| Sep. 29, 1998 | (AU) | PP 6221 |
| Jan. 11, 1999 | (AU) | PP 8099 |

(51) Int. Cl.[7] .................................. G08B 13/14
(52) U.S. Cl. ....................... 340/572.8; 340/572.1; 340/10.42
(58) Field of Search .......... 340/572.8, 572.1, 340/10.1, 10.42, 10.52; 452/173, 157

(56) References Cited

U.S. PATENT DOCUMENTS

| 4,597,495 A | | 7/1986 | Knosby | 209/3.3 |
| 5,781,112 A | * | 7/1998 | Shymko et al. | 340/572.1 |
| 6,166,637 A | * | 12/2000 | Cyr et al. | 340/572.7 |
| 6,196,912 B1 | * | 3/2001 | Lawler, Jr. et al. | 452/173 |
| 6,231,435 B1 | * | 5/2001 | Pilger | 452/157 |

FOREIGN PATENT DOCUMENTS

| AU | 665713 | 11/1994 |
| DE | 4244150 A1 | 6/1994 |
| WO | WO 97/16963 | 5/1997 |

* cited by examiner

*Primary Examiner*—Daniel J. Wu
*Assistant Examiner*—Toan Pham
(74) *Attorney, Agent, or Firm*—Hudak & Shunk Co., L.P.A.

(57) ABSTRACT

An identifying device for a carrier such as meat hook includes a transponder in a housing. The housing may be pinned in place, be pressed into a hole drilled in the meat hook, etc. so that it is held within the bounds of the carrier. Typically the housing is made of ultra high molecular polyethylene and the transponder therein is encased in epoxy resin. As the transponder has a unique code the carrier can be tracked through a meat processing plant despite impacts, harsh cleaning procedures, etc.

25 Claims, 11 Drawing Sheets

CARRIER IDENTIFICATION DEVICE

FIELD OF THE INVENTION

The invention relates to identification systems and to a system to assist in tracking meat from production to packaging. In particular, it relates to a carrier identification device.

BACKGROUND TO THE INVENTION

A greater awareness of health issues has led to an increasing demand from consumers for reassurance about the quality of food-stuffs. Recent problems with the so called 'mad cow disease' has intensified the public demand for an effective method to track meat from production on the farm to packaging and sale to the consumer.

At present, systems exist to track animals on the farm. The most effective systems are those that employ electronic identification. For example, Australian patent number 665713 describes a transponder and housing designed to be resident in the rumen of an animal. International application number PCT/AU96/00693 describes a transponder and housing for attachment to the ear of an animal.

These known systems provide a means of tracking throughout the life of an animal. In combination with computer-based data processing software the complete details of the life of an animal can be logged. The type of information collected includes the age of the animal, feeding history, location, owners, weight tracking etc.

Transponders are particularly well-suited to the electronic identification of animals since they are passive devices that are read actively, they require no internal power supply and are able to hold sufficient information to uniquely identify a single animal amongst several million animals.

Typically, the transponder is removed from the animal before or during slaughtering. This means that continued tracking of the animal can be lost. As mentioned above, it is desirable to continue to track the fate of an animal until processing is complete and the produce has reached the end user. To achieve this aim it is necessary to continue to uniquely identify the animal, or components of the animal, during downstream processing.

Attempts have been made to achieve this goal but they have been uniformly unsuccessful. For example, in one approach all carriers, such as meat hooks, in a meat processing plant are numbered. As an animal is slaughtered and the carcass hung on a hook, the number of the hook is recorded against the number of the animal. At the end of processing, the final packaging is bar coded and a matching of the bar code to the hook number, and hence the animal number, is made.

This approach has proven to be unreliable for a number of reasons. Firstly, a single carcass may be divided into a number of parts requiring several hook numbers to be recorded for a single animal. This can cause confusion and subsequent incorrect tracking.

Secondly, a meat processing plant is a harsh environment. Numbers recorded on a meat hook have been found to wear off relatively quickly. It has been found necessary to interpolate between numbered hooks to identify the number of a hook that is no longer readable. It will be appreciated that if a hook is removed for some reason the integrity of the identification can be seriously compromised.

The harsh environment also impacts on the materials used. In particular, meat hooks in a meat works experience severe thermal cycling which results in repeated contraction and expansion of the meat hook. This can cause problems with attachment of the carrier identification device to the carrier.

Some of these problems have been addressed by Knosby in U.S. Pat. No. 4,597,495 by applying bar codes to each meat hook. However, the harshness of the meat processing environment soon leads to damage of the bar code region thereby rendering the bar code unreadable. Furthermore, a clear and direct line of sight is required to read a bar code. This is difficult to maintain in a meat processing facility due to blood and meat fragments covering equipment and the difficulty of locating a bar code reader in a suitable position. The Knosby system fails to overcome the problems.

OBJECT OF THE INVENTION

It is an object of the present invention to provide a method and means for tracking individual animals through stages of processing. It is a further object to provide a reliable means of uniquely identifying carriers in a food processing environment.

Further objects will be evident from the following description.

DISCLOSURE OF THE INVENTION

In one form, although it need not be the only or indeed the broadest form, the invention resides a carrier identification device for a food processing environment including:

a housing firmly mounted to the carrier in a hole formed in the arm of the carrier; wherein said housing is wholly contained within said hole; and a transponder mounted in the housing, said transponder containing an identifying code.

The housing is preferably pressed into the hole with an interference fit.

A pin may optionally be used to secure the housing in the space.

In preference the transponder contains a unique identifying code.

The housing is preferably formed from food grade material and is heat and acid resistant.

The housing is suitably formed from plastics material and in preference, ultra high molecular weight polyethylene material.

The inventor has found that a cylindrical housing is most suitable.

The transponder is mounted in a cylindrical cavity drilled perpendicular to an axis of the housing. A silicon potting mix can be used to hold the transponder in position.

In preference, the transponder is positioned such that an antenna of the transponder is aligned with an outer face of the housing.

In a further form, the invention resides in a carrier identification device for identifying a meat hook in a meat processing plant, said meat hook being of the form having a body shaped at an upper end to have an "H" section holding a bush;

characterized by a housing firmly mounted to the body in a hole formed in the meat hook, wherein said housing is wholly contained within said hole; and a transponder mounted in the housing, said transponder containing an identifying code.

The hole is preferably formed in an arm of the 'H' section of the meat hook.

Suitably, the housing is press fitted in the hole with interference fit.

The housing is preferably mounted wholly within the hole so that no part of the housing extends beyond an edge of the body.

In a still further form, the invention resides in a carrier identification device for identifying a meat hook in a meat processing plant, said meat hook being of the form having a body curved at an upper end to define a space between a return portion and a main portion with a wheel mounted between the return and main portion; characterized by a housing firmly mounted in a hole formed in the body or in said space, wherein said housing is wholly contained within said hole; and a transponder mounted in the housing, said transponder containing an identifying code.

Suitably, the housing is mounted in the space utilizing one or more pins inserted through aligned holes in the return portion and the main portion so as to clamp the housing against the upper end of the body of the meat hook.

The hole is preferably formed in the main portion. The housing is preferably mounted wholly within the hole or space so that no part of the housing extends beyond an edge of the body.

In preference, the transponder is removably mounted in the housing and the housing is removably mounted to the body.

BRIEF DETAILS OF THE DRAWINGS

To assist in understanding the invention preferred embodiments will now be described with reference to the following figures in which.

Figure 6:
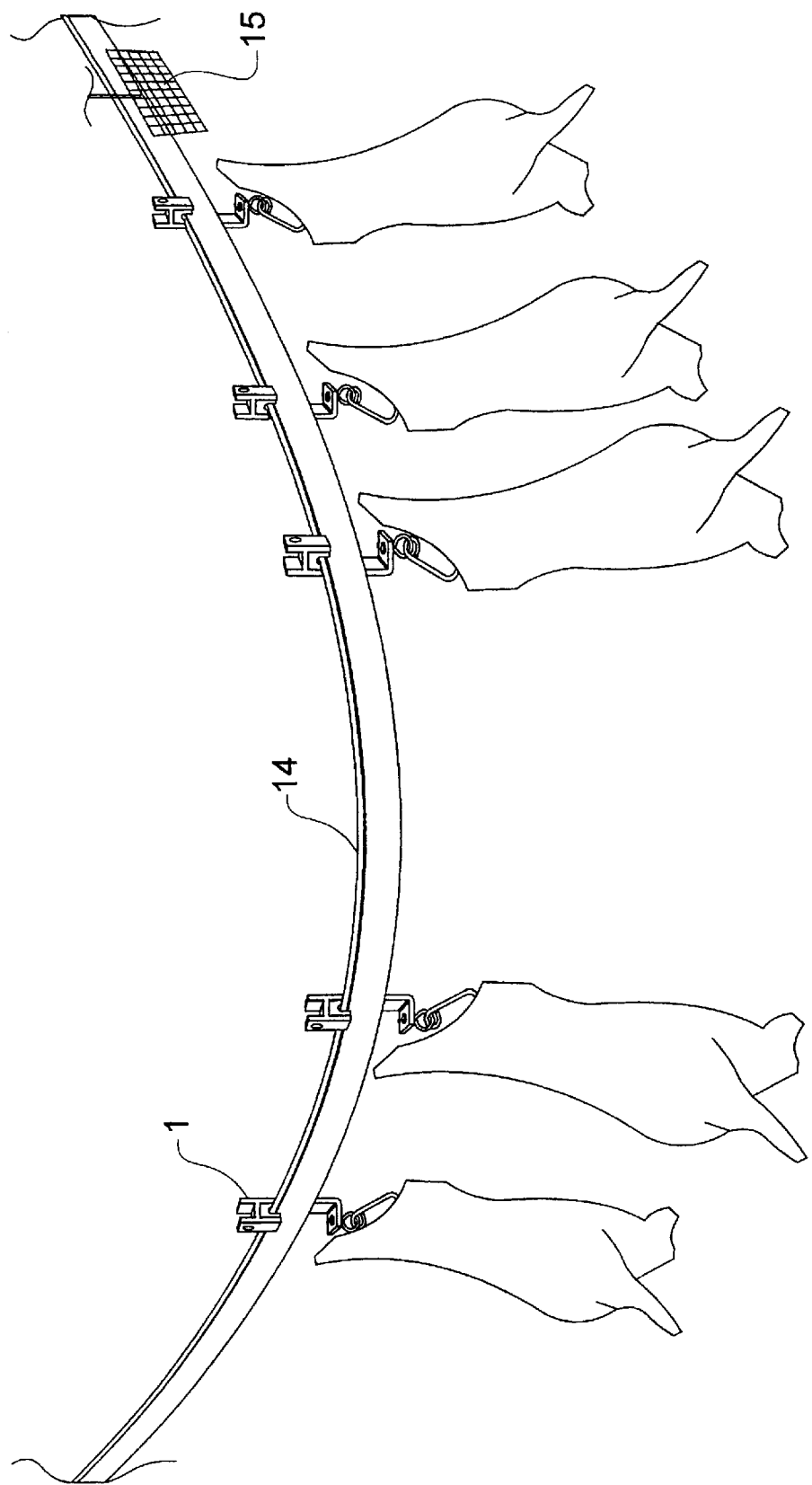
Figure 7:
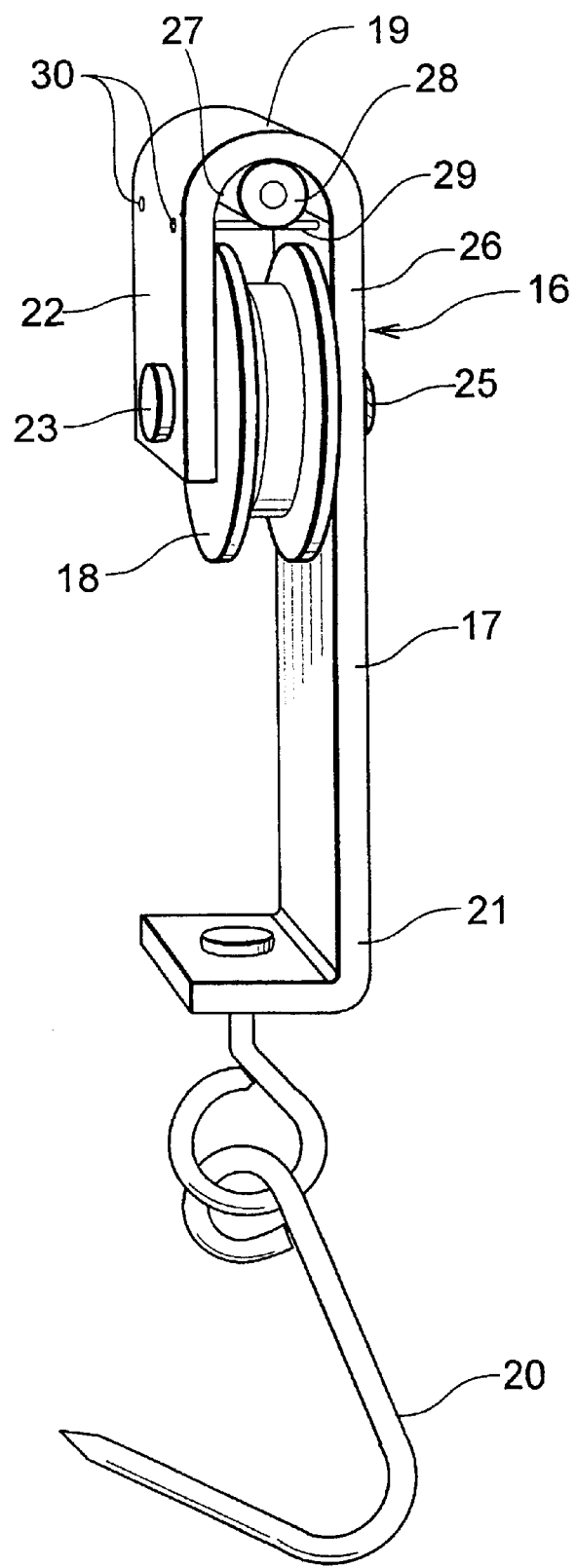
Figures 8, 9:
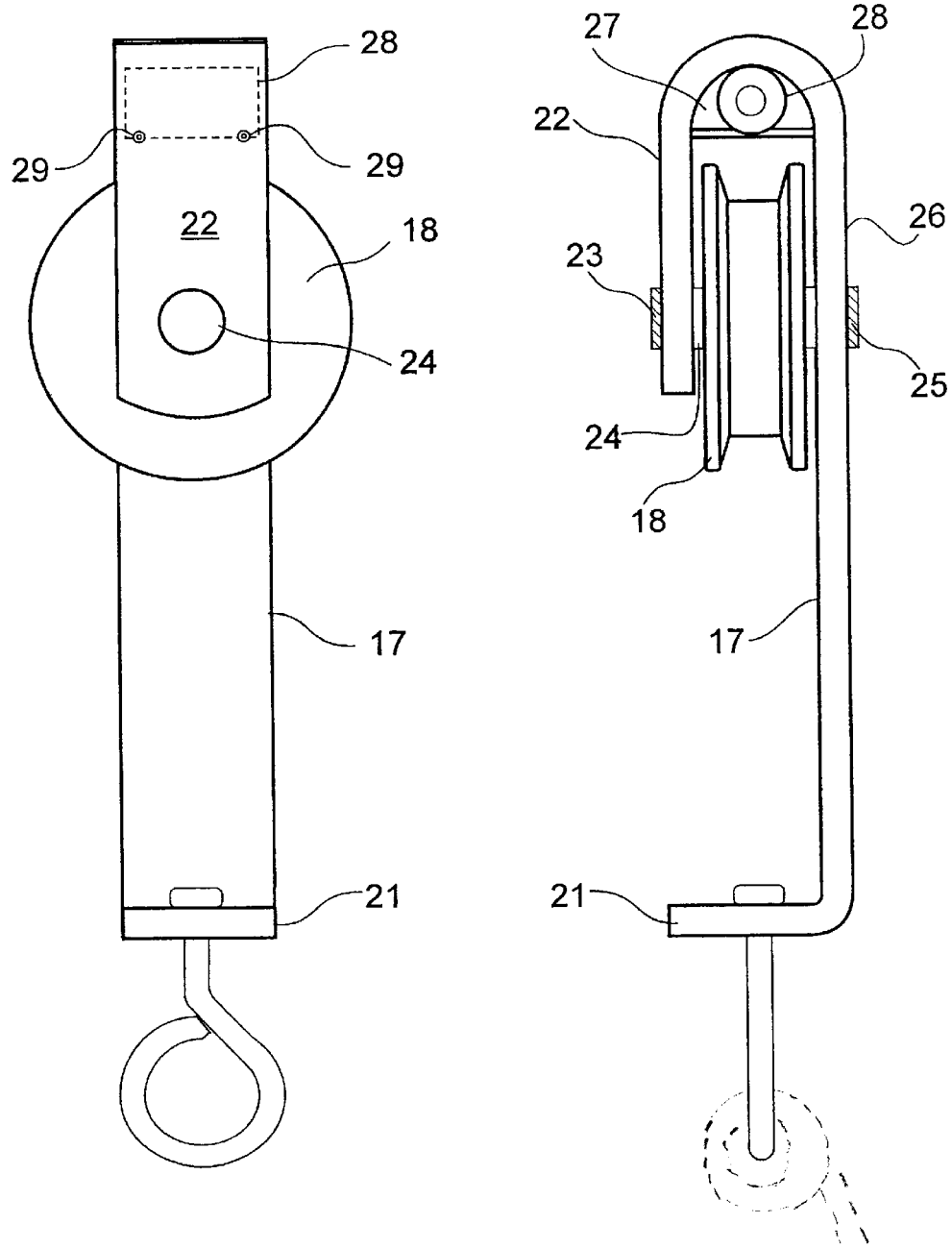
Figure 10:
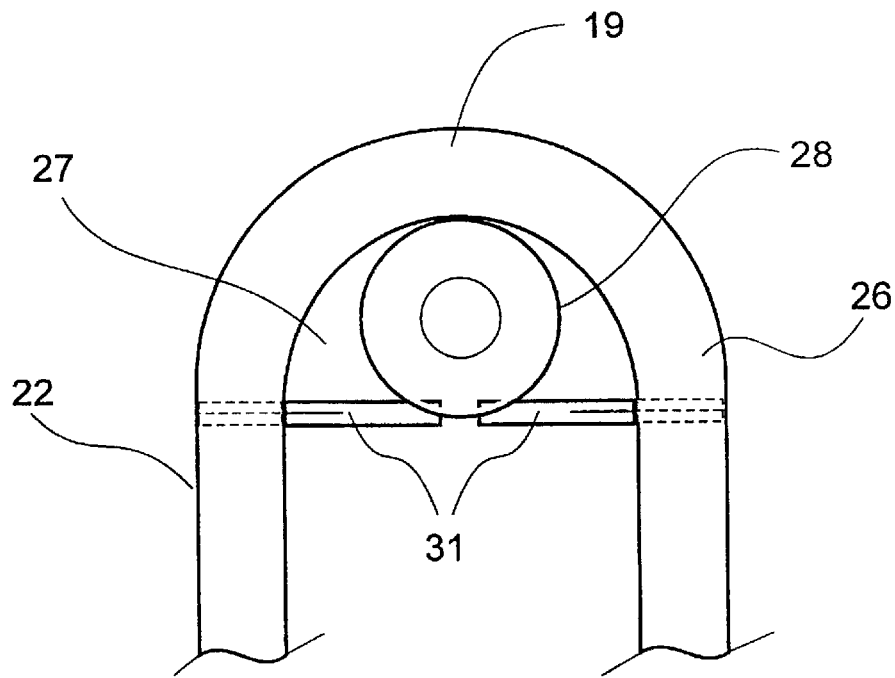
Figure 11:
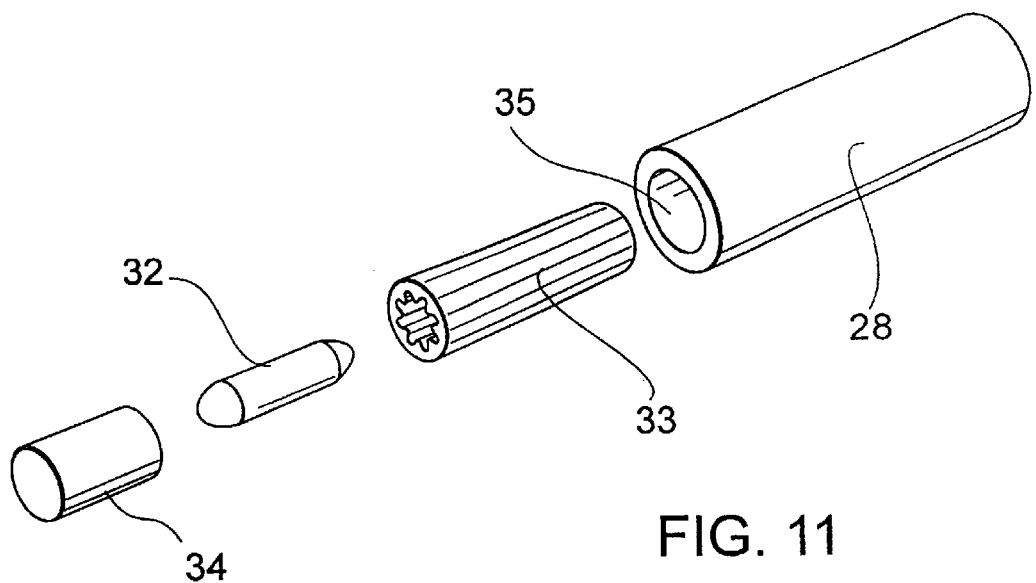

FIG. 6 exemplifies the application of the first embodiment of the invention to a meat processing facility;

FIG. 7 shows a second embodiment of a meat hook with a transponder in place;

FIG. 8 is a front view of the meat hook of FIG. 7 showing the transponder housing in hidden detail;

FIG. 9 is a side view of the meat hook of FIG. 7 showing one means for holding the transponder in position;

FIG. 10 shows an alternate means to FIG. 9 for holding the transponder in place;

FIG. 11 shows in detail the fitting of the transponder within the housing; and

Figure 12:
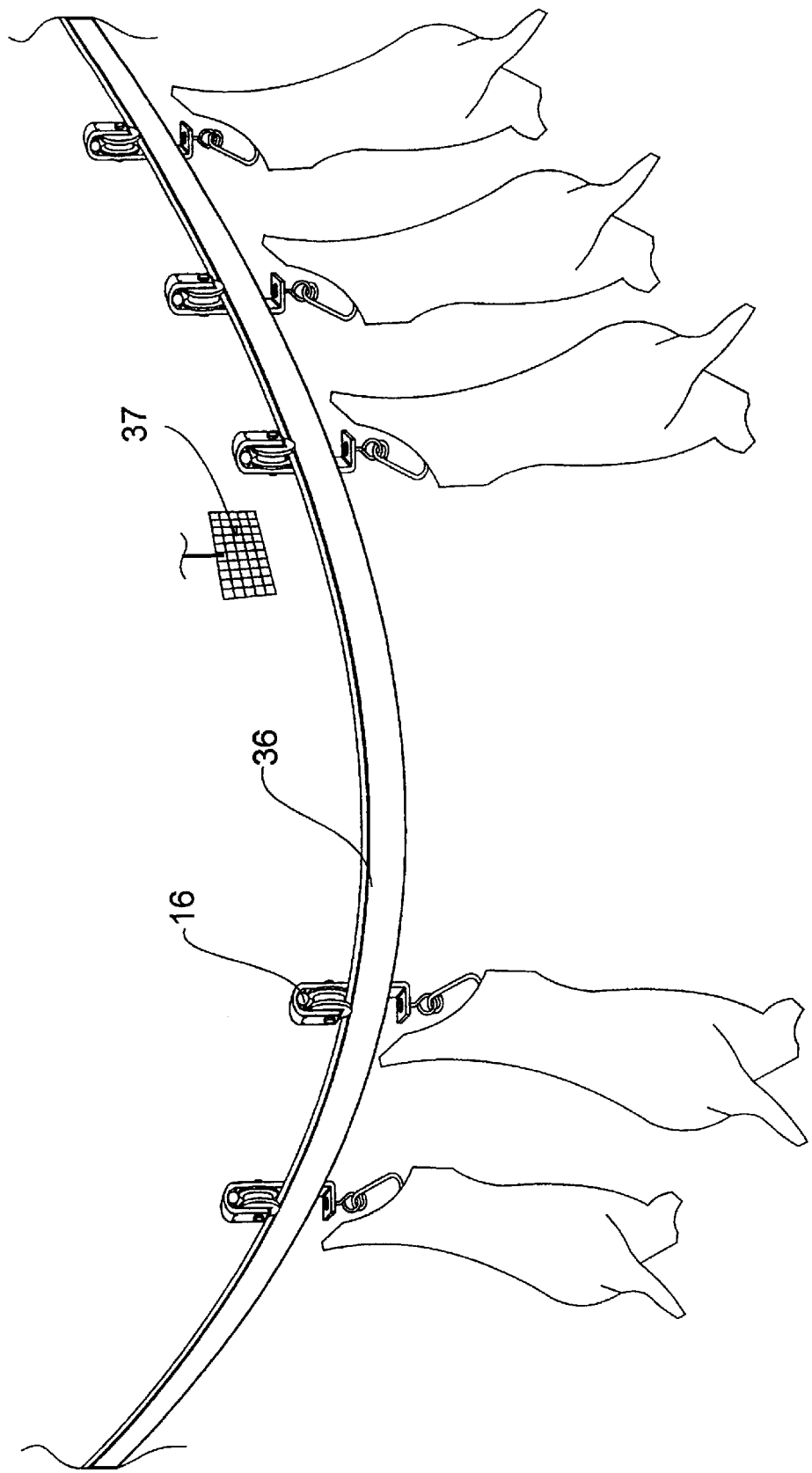
Figure 13:
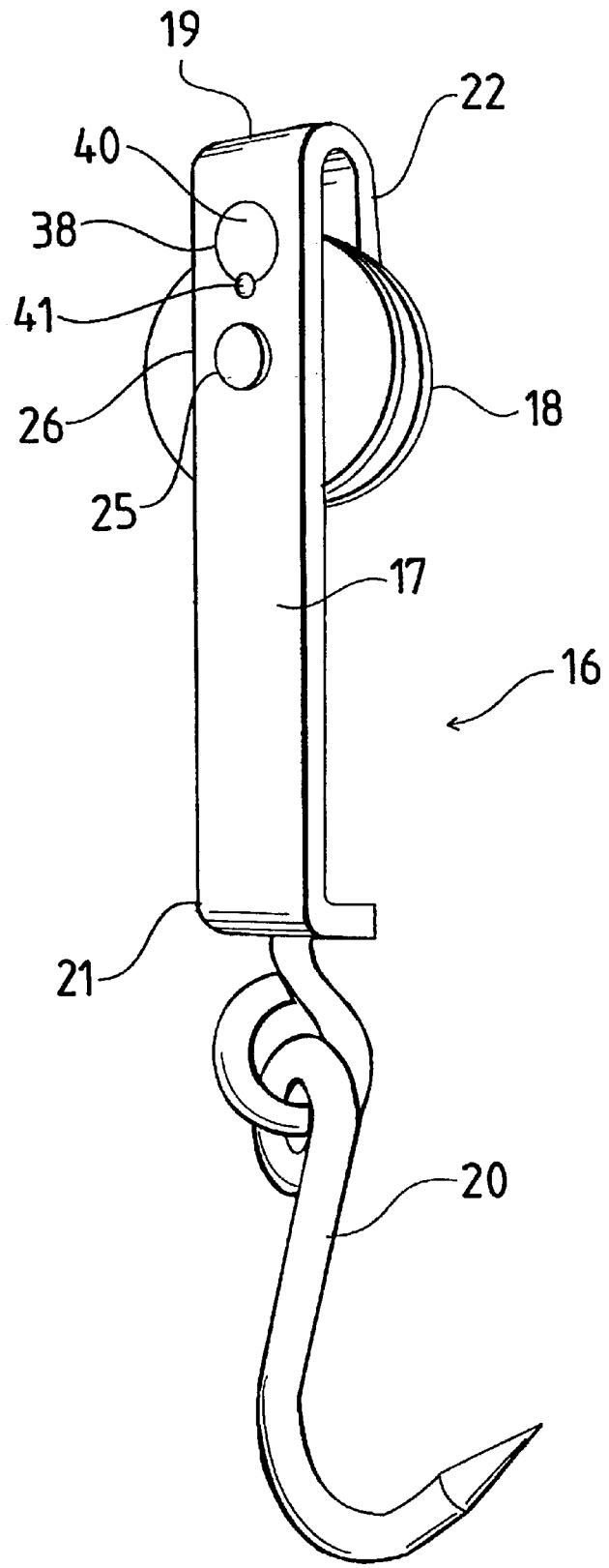
Figure 14:
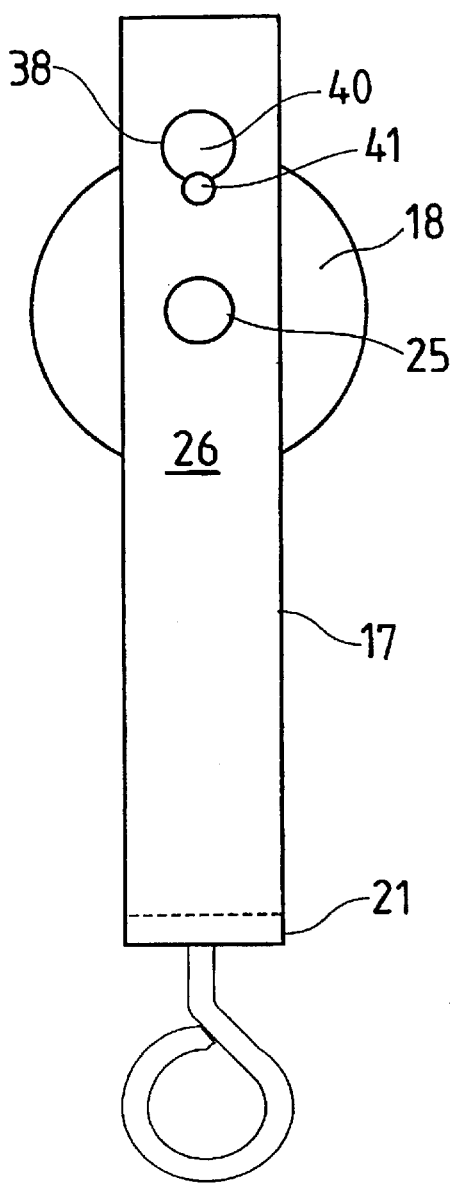
Figure 15:
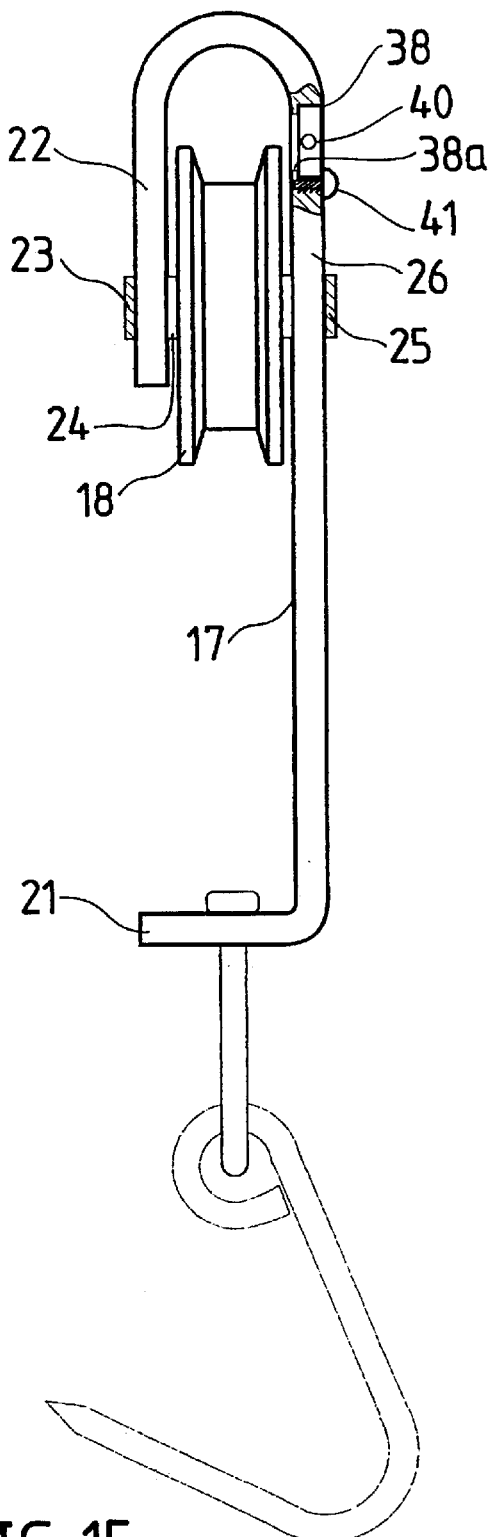
Figure 16:
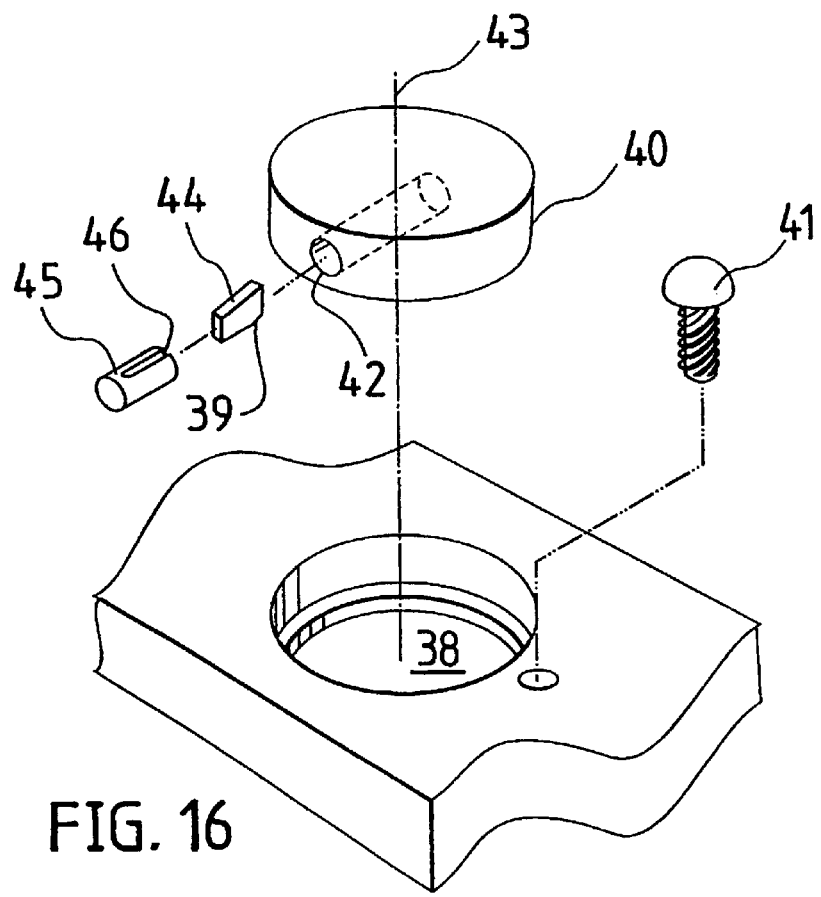
Figure 17:
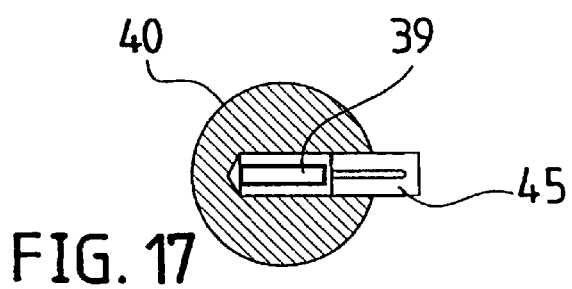

FIG. 12 exemplifies the application of the second embodiment of the invention to a meat processing facility;

FIG. 13 shows a third embodiment of a meat hook with a transponder in place;

FIG. 14 is a font view of the meat hook of FIG. 13;

FIG. 15 is a cut away side view of the meat hook of FIG. 13 showing the means for holding the transponder in position;

FIG. 16 shows in detail the fitting of the transponder within the housing and the housing in the hole;

FIG. 17 shows the fitting of the transponder in the housing; and

Figure 18:
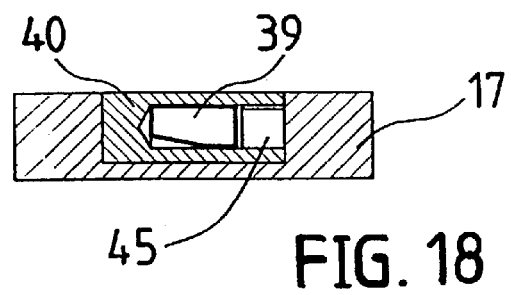

FIG. 18 shows a cross-section side view of the transponder in the housing in the body.

DETAILED DESCRIPTION OF THE DRAWINGS

Figure 1:
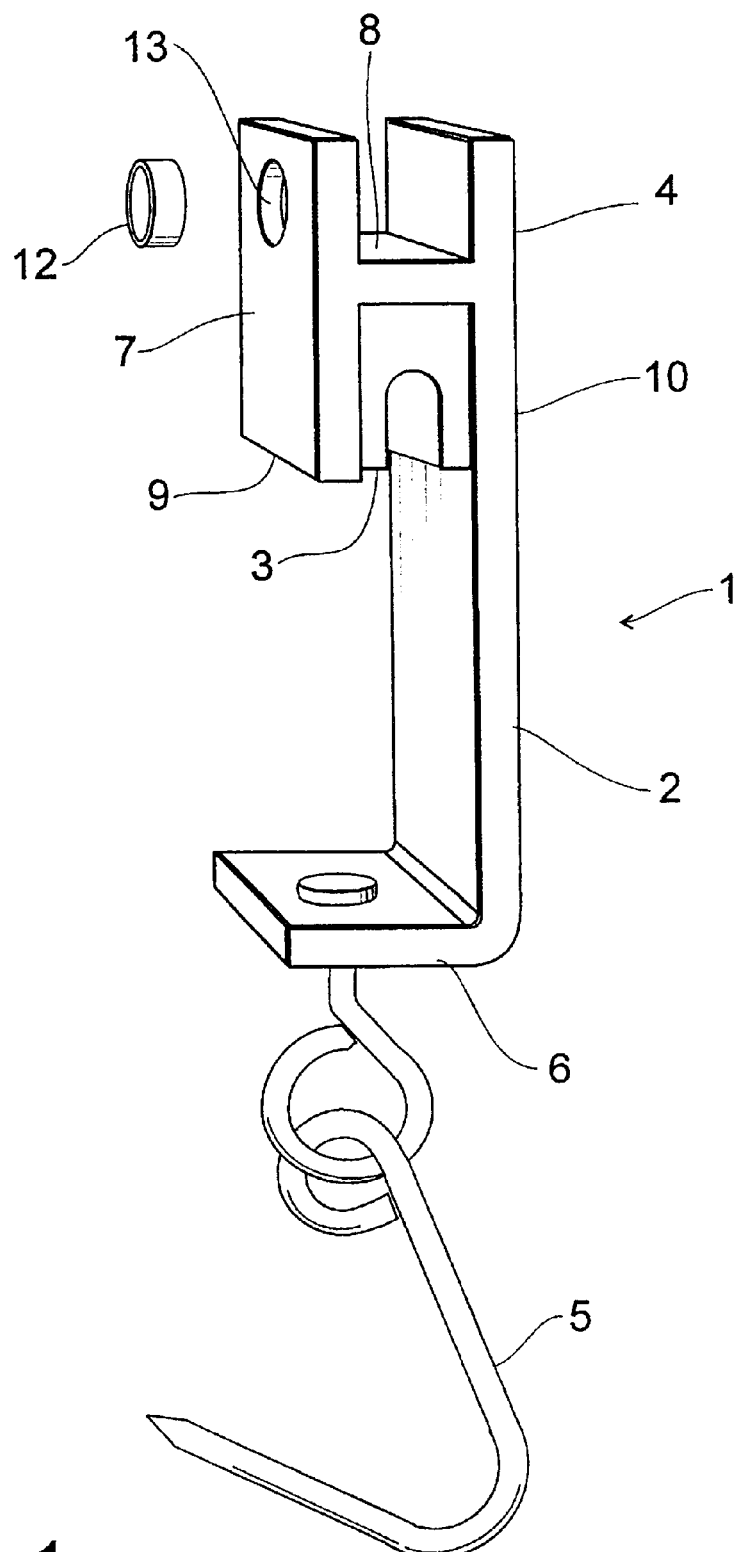
FIG. 1 shows a first embodiment of meat hook with a transponder in place.

In the drawings, like reference numerals refer to like parts. There is shown in FIG. 1 a first embodiment of a carrier for an animal carcass. The carrier is in the form of a meat hook 1, consisting of a body 2 having a bush 3 located at an upper end 4 and a hook 5 hanging from a lower end 6. The body 2 is formed at the upper end 4 to form an 'H' section 7 that supports the bush 3. The cross 8 of the 'H' section 7 supports the top of the bush 3 which is wedged between the arms 9, 10 of the 'H' section.

An electronic identification device, such as a transponder 11 in a housing 12, is located in a hole 13 formed in the arm 9 of the 'H' section 7. The housing 12 is pressed into the hole 13 with an interference fit such that the housing 12 is securely held within the hole 13. However, if the meat hook 1 becomes damaged, the housing 12 can be pressed from the hole 13 for recovery of the transponder 11 and housing 12.

Figure 2:
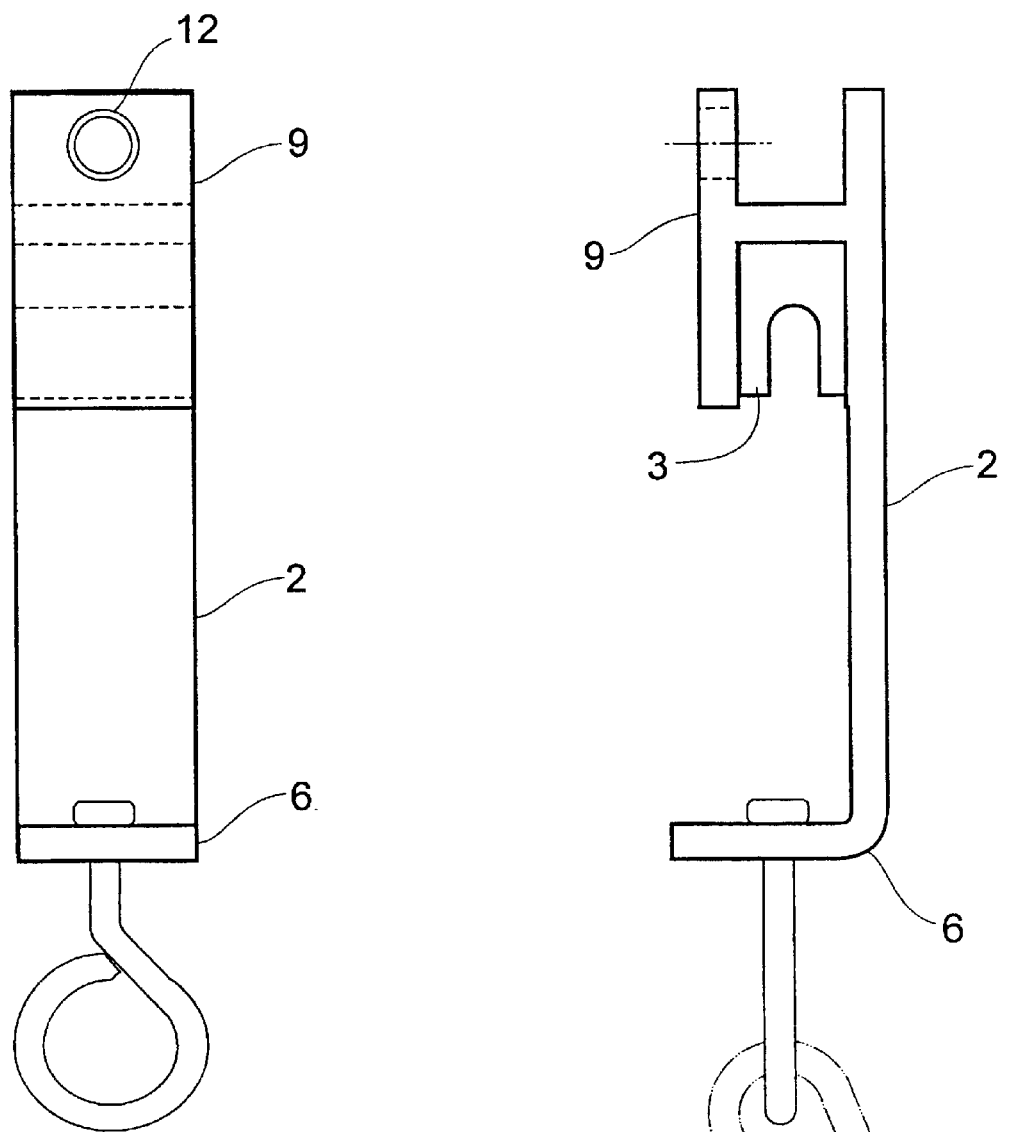
FIG. 2 is a front view of the meat hook of FIG. 1 showing the transponder.
Figure 3:
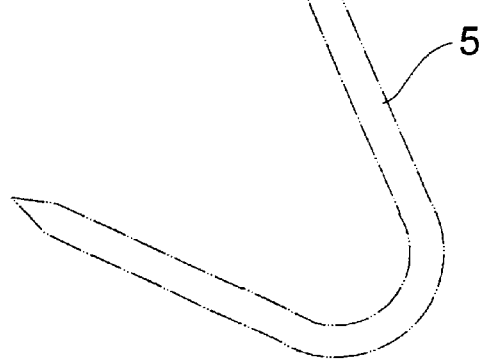
FIG. 3 is a side view of the meat hook of FIG. 1 showing the location of the transponder in hidden detail.

The preferred position of the hole 13 in the arm 9 is shown most clearly in FIG. 2 and FIG. 3. By placing the hole 13 at an upper part of one of the arms of the 'H' section the transponder and housing are easily fitted and removed. However, the transponder is protected from damage due to the containment of the housing 12 within the boundaries of the meat hook 1.

The meat hook 1 is made from metal and may therefore interfere with the signal obtained from a transponder. However, the inventor has found that the transponder signal can be read from up to one meter away providing that the transponder is located a suitable distance from the body of the meat hook. The inventor has found that a housing with 26 mm diameter can house a 12 mm long transponder without significant interference to the operation of the transponder.

Figure 4:
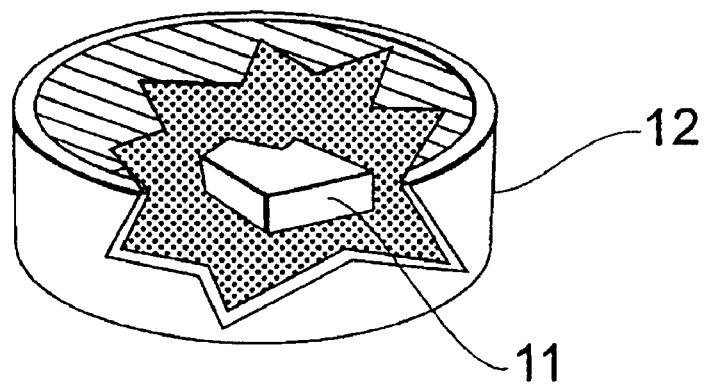
FIG. 4 shows a cutaway perspective view of the housing of FIG. 1.
Figure 5:
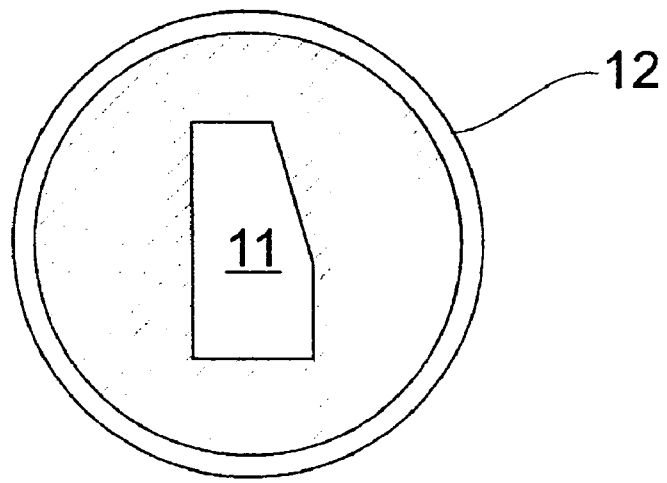
FIG. 5 shows a plan view of the location of the transponder in the housing of FIG. 4.

The positioning of the transponder 11 within the housing 12 is shown most clearly in FIG. 4 and FIG. 5. The embodiment consists of a 26 mm diameter housing holding a flat transponder approximately 12 mm×6 mm by 4 mm thick. There is a minimum spacing between the transponder and the housing of at least 4 mm. It will be appreciated that the specific minimum distance will depend upon the size and nature of the transponder, the nature of the housing, the power of the reading antenna, the distance to the reading antenna, and the metal of the meat hook. The figures show one preferred embodiment of transponder and location. Other transponders may also be suitable with appropriate positioning.

The environment within a meat processing facility is particularly harsh. As previously discussed, the prior art hook identification systems have proven to be ineffective. This is because hooks may be dropped on concrete, dipped in caustic solutions, knocked together and generally treated very roughly. One particular damage mechanism is when the hook 5 of an adjacent meat hook 1 swings up and impacts the meat hook. Such impacts are often sufficiently extreme to require maintenance of the meat hook, particularly the bush.

In order to survive in this environment the housing 12 must be strongly held in the hole 13. It is also important that the transponder is suitably mounted in the housing. One preferred arrangement is to encase the transponder within a suitable resin. To ensure that the transponder is correctly positioned within the housing, an initial layer of resin is poured into the housing. The transponder is then carefully positioned in the center of the housing and a covering layer of resin is poured. A suitable resin is an epoxy resin able to withstand temperatures up to 140° C. The resin must also be resistant to phosphoric acid that is used to clean the meat hooks.

The structure of the housing and the manner of securing the housing on the meat hook facilitates maintenance when required. If the transponder fails the housing can be quickly removed and replaced. If the meat hook becomes unserviceable the housing can be pressed from the hole and fitted to another hook.

Finally, when meat from the animal is packaged for retail sale the bar code on the packaging will provide the starting point for a recorded history of the animal from birth to consumption.

The use of the meat hook identification device is depicted in FIG. 6. A plurality of meat hooks are suspended on a track 14 When an animal is slaughtered the identification of the animal is recorded, suitably by reading the transponder resident in the animals rumen or ear tag. The carcass is hung on a meat hook, or a number of meat hooks if the carcass is divided. The identity of the meat hook(s) is recorded against the animal identification.

At each stage of processing of the carcass the meat hook identification is determined by an antenna, such as 15. The processing data, such as weight, quality, wastage etc is recorded at each processing station. A typical processing plant may have six or more antennas for tracking the carcass.

It will be appreciated that locating the housing 12 in the hole 13 affords a degree of protection to the housing thereby overcoming some of the problems of the prior art. Furthermore, the use of electronic identification overcomes the problem of erasure that occurs with the bar code system of Knosby. It will also be appreciated that the transponder housing does not cause a cleaning problem as there are no areas in which meat portions or blood can be trapped.

There is shown in FIG. 7 a second embodiment of a carrier for an animal carcass. The carrier is in the form of a meat hook 16, consisting of a body 17 having a wheel 18 located at an upper end 19 and a hook 20 hanging from a lower end 21. The body 17 is turned at the upper end 19 to form a return portion 22 that supports the outer end 23 of the wheel axle 24. The near end 25 of the wheel axle 24 is supported by a main portion 26 of the body 17. A space 27 is formed above the wheel 18 between the return portion 22 and the main portion 26 of the body 17.

An electronic identification device, such as a transponder (not visible) in a housing 28, is located in the space 27. In the embodiment shown in FIG. 7 the housing 28 is held in place by roll pins 29 that extend from the return portion 22 to the main portion 26 of the body 17. Suitably there are two roll pins 29 spaced towards the ends of the transponder housing 28.

Roll pins are formed from rolled metal and provide a high degree of resilient compressibility. When forced into a hole the roll pin will try to expand and thereby be firmly held within the hole.

In the embodiment shown, holes 30 are formed in the return portion 22 and the main portion 26 of the body 17. The holes are aligned so that a single roll pin can be pushed through a pair of holes from one side. The pins may be suitably biased to apply moderate pressure against the housing 28. In this manner the housing 28 is held firmly against the upper end 19 of the body 17.

It will also be appreciated that the roll pins 29 form a closed electric circuit with the upper end 19 of the body 17. This circuit can interfere with the operation of the transponder. In order to overcome this problem the inventor has found that the roll pins 29 must be spaced beyond the ends of the transponder as it is positioned within the housing located in the space at the upper end of the body.

The problem can also be addressed by providing pins 31 that are not continuous, as shown in FIG. 10. If pins 31 are used they can be positioned anywhere along the housing. Such a solution is not preferred since the housing 28 is not held as strongly against the upper end 19.

It will be appreciated that other types of pins can be used instead of roll pins. Pins having split ends, as depicted in FIG. 10, may also be suitable. A non-conducting bush could be placed within the holes around the pins. Other methods of holding the housing in the space could also be used (for example, glue, vertical pins, single sided pins, screws), however, the inventors have found that roll pins provide reliable holding of the housing 28 in the space 27.

One preferred arrangement for holding a transponder in the housing is shown in FIG. 11. A transponder 32 is fitted within a shock absorbing sheath 33, which is snugly located within the housing 28. A removable plug 34 closes the aperture 35 through which the transponder 32 and sheath 33 are loaded.

A typical embodiment consists of a 23 mm long transponder having a diameter of 3 mm located within a housing 45 mm long with a diameter of 23 mm. The aperture has a diameter of 7 mm to receive the transponder when surrounded by the sheath. Different size transponders and housings will also be suitable.

The housing is suitably made from a hard material, such as barium sulphate bound in polyropylene or a ceramic, that is able to withstand impacts expected in a meat processing facility. The material must also be food grade, heat resistant and acid resistant.

The structure of the housing and the manner of securing the housing on the meat hook facilitates maintenance when required. If the transponder fails it can be quickly removed and replaced by virtue of the removable plug 34. If the meat hook becomes unserviceable the housing can be removed, by roll pins, and fitted to another hook. If the housing is damaged the transponder is recoverable for continued use.

The use of the second embodiment of the invention is depicted in FIG. 12. A plurality of meat hooks are suspended on a track 36. At each stage of processing of the carcass the heat hook identification is determined by an antenna, such as 37. In other respects the facility of FIG. 12 is similar to that described with respect to FIG. 6.

A third embodiment of the invention is shown in FIGS. 13, 14 and 15. The meat hook 16 has the same design as the meat hook shown in FIG. 7. The meat hook 16 consists of a body 17 having a wheel 18 located at an upper end 19 and a hook 20 hanging from a lower end 21. The body 17 is turned at the upper end 19 to form a return portion 22 that supports the outer end 23 of the wheel axle 24. The near end 25 of the wheel axle 24 is supported by a main portion 26 of the body 17. A hole 38 is formed in the main portion 26 of the body 17. The hole 38 has a lip 38a on the inside, as seen most clearly in FIG. 15.

An electronic identification device, such as a transponder 39 in a housing 40, is located in the hole 38. In the embodiment shown in FIG. 13 the housing 40 fits into the hole 38 with an interference fit and is secured by hammer screw 41.

The hammer screw 41 is hammered into a hole drilled in the main portion 26 adjacent the hole 38. The rounded head prevents snagging but allows for removal of the hammer screw. Removal is effected by using a cold chisel and hammer to unscrew the hammer screw. The housing 40 is held firmly within the hole 38 but can be removed if replacement of the transponder 39 is required.

In the third embodiment shown, the housing 40 is fitted in a hole in the main portion 26. It will be appreciated that it could be fitted into a similar hole in the return portion 22.

The inventor has found that, in some situations, the rotating wheel 18 can generate a magnetic field that interferes with the operation of the transponder 39. This problem can be overcome by careful placement of the transponder 39 within the housing 40. As shown in FIG. 16, the transponder 39 is positioned in a cylindrical cavity 42 drilled into the side of the cylindrical housing 40. The cavity 42 is generally perpendicular to the axis 43 of the housing 40. The transponder 39 is placed in the cavity 42 so that the antenna face 44 is facing outwards. The housing 40 is then placed in the hole 38 so that the transponder is positioned generally transversely with respect to the body 17 of the meat hook 16.

To hold the transponder 39 in the cavity 42 a silicon potting mix is injected into the hole. A plug 45 clamps against the transponder and seals the cavity. A channel 46 in the plug 45 allows excess silicon to escape. During assembly the plug 45 will extend beyond the housing, as seen in FIG. 17. Once the silicon potting mix has cured the excess plug can be cut away. The housing 40 is then fitted to the body 17 to achieve the alignment shown in side view in FIG. 18.

A suitable material for the housing 40 is a machinable ultra high molecular weight polyethylene. The inventor has used a product known as Tivar® 1000 available from Menasha Corporation through Cadillac Plastics in Australia. This material is heat and acid resistant, of food grade and has good mechanical properties.

The structure of the housing and the manner of securing the housing on the meat hook facilitates maintenance when required. If the transponder fails it can be quickly removed and replaced by virtue of the removable plug 45. If the meat hook becomes unserviceable the housing can be removed, by removing the hammer screw, and fitting to another hook. If the housing is damaged the transponder is recoverable for continued use.

In an alternative tracking system, read/write transponders are used on the carrier. The animal identification is read from the animal as it is being slaughtered and is written into the transponder on the meat hook (or hooks) that carry the carcass. At the end of processing the identification can be written into the bar code on the packaging. This system provides direct identification of the history of a consumer meat product.

While the above discussion has focused on the application of electronic identification to meat hooks in a meat processing facility, the inventor conceives of other applications, such as identifying components in a manufacturing facility. In each case, the specific problems of security, readability and longevity must be addressed.

Throughout the specification the aim has been to describe the preferred embodiments of the invention without limiting the invention to any one embodiment or specific collection of features.

What is claimed is:

1. A carrier identification device for identifying a carrier in a food processing environment comprising:
    a housing firmly mounted to the carrier in a hole formed in the arm of the carrier, wherein said housing is wholly contained within said hole; and
    a transponder mounted in the housing, said transponder containing an identifying code.

2. The device of claim 1 wherein the housing is pressed into the hole with an interference fit.

3. The device of claim 1 further comprising a pin securing the housing in the hole.

4. The device of claim 1 wherein the transponder contains a unique identifying code.

5. The device of claim 1 wherein the housing is formed from food grade is material.

6. The device of claim 1 wherein the housing is heat and acid resistant.

7. The device of claim 1 wherein the housing is formed from plastics material.

8. The device of claim 1 wherein the housing is formed from ultra high molecular polyethylene material.

9. The device of claim 1 wherein the transponder is mounted in a cavity formed in the housing such that an antenna of the transponder is aligned with an outer face of the housing.

10. A carrier identification device for identifying a meat hook in a meat processing plant, said meat hook being of the form having a body shaped at an upper end to have an "H" section holding a bush;
    characterized by a housing firmly mounted to the body in a hole formed in the meat hook, wherein said housing is wholly contained within said hole; and a transponder mounted in the housing, said transponder containing an identifying code.

11. The device of claim 10 wherein the hole is formed in an arm of the 'H' section of the meat hook.

12. The device of claim 10 wherein the housing is press fitted in the hole with interference fit.

13. The device of claim 10 wherein the housing is mounted wholly within the hole so that no part of the housing extends beyond an edge of the body.

14. A carrier identification device for identifying a meat hook in a meat processing plant, said meat hook being of the form having a body curved at an upper end to define a space between a return portion and a main portion with a wheel mounted between the return and main portion; characterized by a housing firmly mounted in a hole formed in the body or in said space, wherein said housing is wholly contained within said hole; and a transponder mounted in the housing, said transponder containing an identifying code.

15. The device of claim 14 wherein the housing is mounted in the space utilizing one or more pins inserted through aligned holes in the return portion and the main portion so as to clamp the housing against the upper end of the body of the meat hook.

16. The device of claim 15 wherein the housing is mounted wholly within the space so that no part of the housing extends beyond an edge of the body.

17. The device of claim 14 wherein the housing is mounted in a hole formed in the meat hook.

18. The device of claim 17 wherein the hole is formed in the main portion and the housing is mounted wholly within the hole so that no part of the housing extends beyond an edge of the body.

19. The device of claim 14 wherein the transponder is removably mounted in the housing and the housing is removably mounted to the body.

20. The device of claim 14 wherein the transponder is mounted within the housing in a shock absorbing sheath.

21. The device of claim 14 wherein the housing is press fitted in a hole formed in the meat hook.

22. The device of claim 21 further comprising a pin securing the housing in the space.

23. The device of claim 22 wherein the pin is a hammer screw.

24. The device of claim 14 wherein the transponder is mounted in a cavity formed in the housing such that an antenna of the transponder is aligned with an outer face of the housing.

25. A carrier identification device for identifying a carrier in a food processing environment comprising:

a housing firmly mounted to the carrier in a hole formed in an arm of the carrier, wherein said housing is made of rigid material and is wholly contained within said hole; and a transponder mounted in the housing, said transponder containing an identifying code.

* * * * *